United States Patent [19]
Wong

[11] Patent Number: 6,128,848
[45] Date of Patent: Oct. 10, 2000

[54] SUPPORT FOR FISHING ROD

[76] Inventor: Tom Y. W. Wong, 2448 East 12th Avenue, Vancouver, Canada, V5M 2C2

[21] Appl. No.: 09/296,307

[22] Filed: Apr. 22, 1999

[51] Int. Cl.⁷ .................................................. A01K 97/10
[52] U.S. Cl. ............................................................ 43/21.2
[58] Field of Search .............................. 43/21.2; 42/94; 248/538, 545, 167

[56] References Cited

U.S. PATENT DOCUMENTS

| | | | |
|---|---|---|---|
| D. 221,279 | 7/1971 | Erickson | D22/8 |
| 1,089,307 | 3/1914 | Benet | 42/94 |
| 1,091,491 | 3/1914 | Ebur | 43/21.2 |
| 2,438,388 | 3/1948 | Dolk | 43/21.2 |
| 2,806,670 | 9/1957 | Straster | 248/167 |
| 2,921,763 | 1/1960 | Miller | 248/167 |
| 3,431,670 | 3/1969 | Harpham | 43/21.2 |
| 3,636,649 | 1/1972 | Paiva | 43/21.2 |
| 4,043,070 | 8/1977 | Lamothe | 43/21.2 |
| 4,086,716 | 5/1978 | Donahue | 43/21.2 |
| 5,359,803 | 11/1994 | Shieh | 43/21.2 |
| 5,367,815 | 11/1994 | Liou | 43/21.2 |

*Primary Examiner*—Kurt Rowan

[57] ABSTRACT

A support for fishing rod for supporting the tip of a fishing rod in a raised orientation. The support for fishing rod includes a head portion, a pair of first legs pivotally coupled to the head portion and downwardly depending therefrom, and a pair of second legs pivotally coupled to the first legs. Each of the second legs is telescopically extendible. The head portion has a channel extending into an upper face thereof that is adapted for receiving a fishing rod therein.

11 Claims, 3 Drawing Sheets

SUPPORT FOR FISHING ROD

BACKGROUND OF THE INVENTION

1. Field of the Invention

The present invention relates to fishing equipment and more particularly pertains to a new support for fishing rod for supporting the tip of a fishing rod in a raised orientation.

2. Description of the Prior Art

The use of fishing equipment is known in the prior art. More specifically, fishing equipment heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,086,716; 5,152,093; 4,854,069; 5,367,815; 3,431,670; and U.S. Pat. No. Des. 190,330.

While these devices fulfill their respective, particular objectives and requirements, the aforementioned patents do not disclose a new support for fishing rod. The inventive device includes a head portion, a pair of first legs pivotally coupled to the head portion and downwardly depending therefrom, and a pair of second legs pivotally coupled to the first legs. Each of the second legs is telescopically extendible. The head portion has a channel extending into an upper face thereof that is adapted for receiving a fishing rod therein.

In these respects, the support for fishing rod according to the present invention substantially departs from the conventional concepts and designs of the prior art, and in so doing provides an apparatus primarily developed for the purpose of supporting the tip of a fishing rod in a raised orientation.

SUMMARY OF THE INVENTION

In view of the foregoing disadvantages inherent in the known types of fishing equipment now present in the prior art, the present invention provides a new support for fishing rod construction wherein the same can be utilized for supporting the tip of a fishing rod in a raised orientation.

The general purpose of the present invention, which will be described subsequently in greater detail, is to provide a new support for fishing rod apparatus and method which has many of the advantages of the fishing equipment mentioned heretofore and many novel features that result in a new support for fishing rod which is not anticipated, rendered obvious, suggested, or even implied by any of the prior art fishing equipment, either alone or in any combination thereof.

To attain this, the present invention generally comprises a head portion, a pair of first legs pivotally coupled to the head portion and downwardly depending therefrom, and a pair of second legs pivotally coupled to the first legs. Each of the second legs is telescopically extendible. The head portion has a channel extending into an upper face thereof that is adapted for receiving a fishing rod therein.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. Tithe invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new support for fishing rod apparatus and method which has many of the advantages of the fishing equipment mentioned heretofore and many novel features that result in a new support for fishing rod which is not anticipated, rendered obvious, suggested, or even implied by any of the prior art fishing equipment, either alone or in any combination thereof.

It is another object of the present invention to provide a new support for fishing rod which may be easily and efficiently manufactured and marketed.

It is a further object of the present invention to provide a new support for fishing rod which is of a durable and reliable construction.

An even further object of the present invention is to provide a new support for fishing rod which is susceptible of a low cost of manufacture with regard to both materials and labor, and which accordingly is then susceptible of low prices of sale to the consuming public, thereby making such support for fishing rod economically available to the buying public.

Still yet another object of the present invention is to provide a new support for fishing rod which provides in the apparatuses and methods of the prior art some of the advantages thereof, while simultaneously overcoming some of the disadvantages normally associated therewith.

Still another object of the present invention is to provide a new support for fishing rod for supporting the tip of a fishing rod in a raised orientation.

Yet another object of the present invention is to provide a new support for fishing rod which includes a head portion, a pair of first legs pivotally coupled to the head portion and downwardly depending therefrom, and a pair of second legs pivotally coupled to the first legs. Each of the second legs is telescopically extendible. The head portion has a channel extending into an upper face thereof that is adapted for receiving a fishing rod therein.

Still yet another object of the present invention is to provide a new support for fishing rod that frees up a fisherman's hands to perform other tasks.

Even still another object of the present invention is to provide a new support for fishing rod that permits a fisherman to use more than one rod at a time.

Even still yet another object of the present invention is to provide a new support for fishing rod that prevents a rod from being laid down on the ground and getting dirty and scratched.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
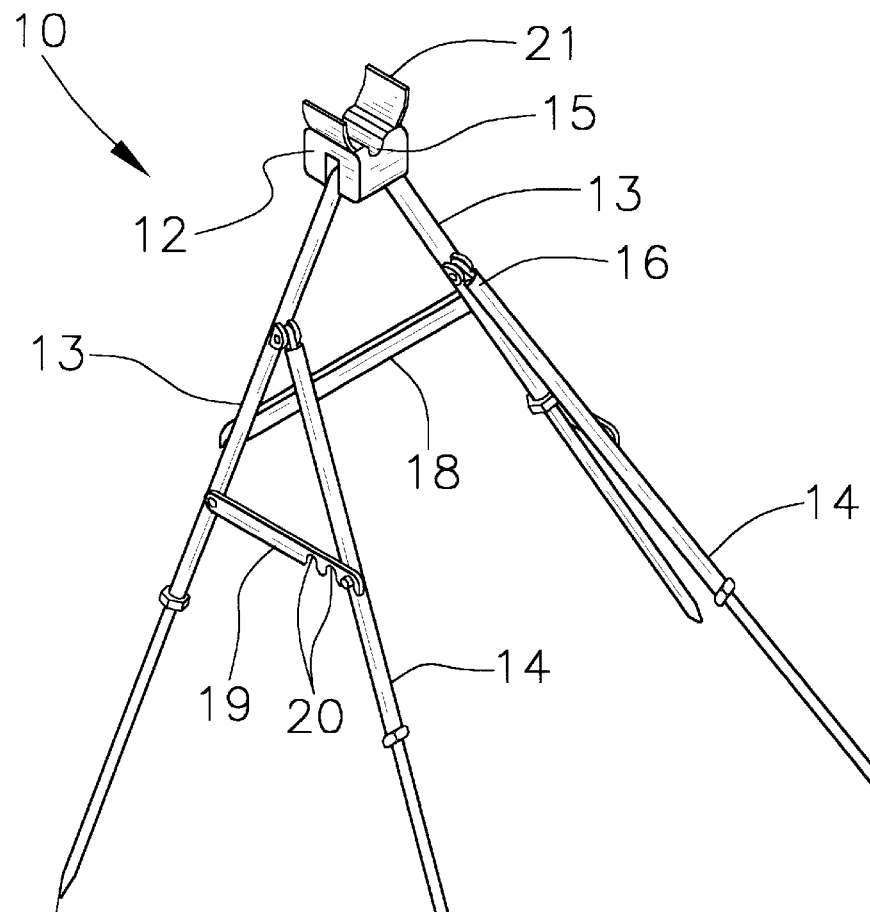
FIG. 1 is a schematic perspective view of a new support for fishing rod according to the present invention.
Figure 8:
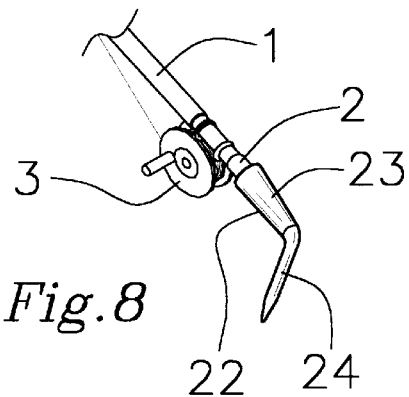
FIG. 8 is a schematic perspective view of a rod end holder of the present invention.
Figure 2:
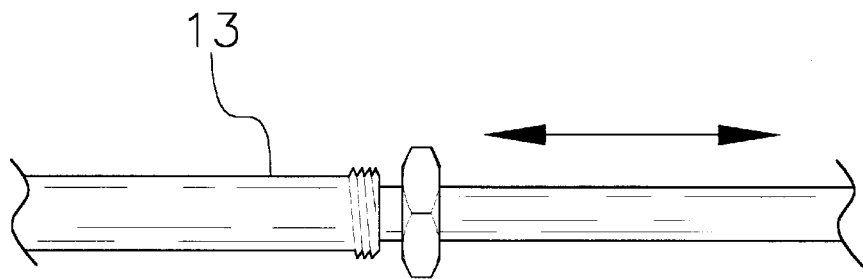
FIG. 2 is a schematic detailed view of the present invention.
Figure 3:
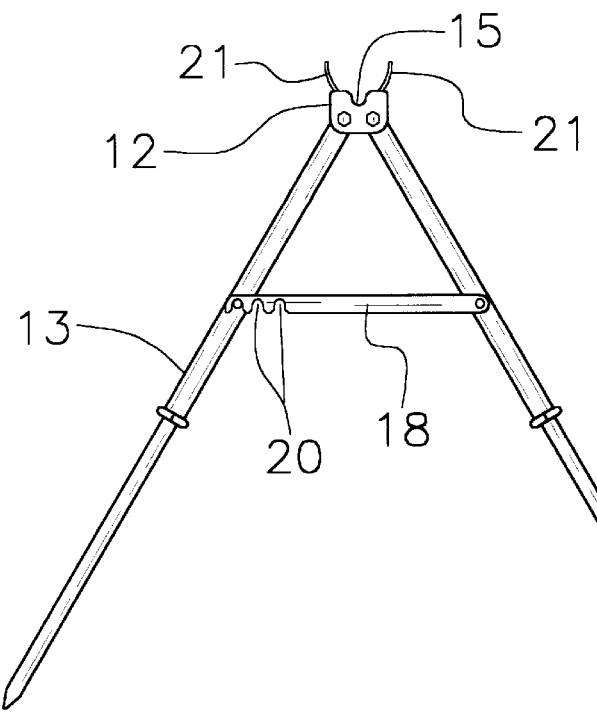
FIG. 3 is a schematic side view of the present invention.
Figure 4:
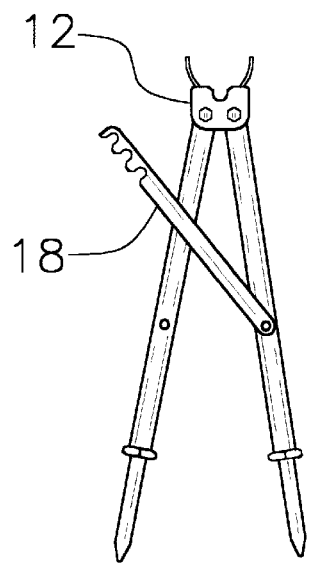
FIG. 4 is a schematic side view of the present invention.
Figure 5:
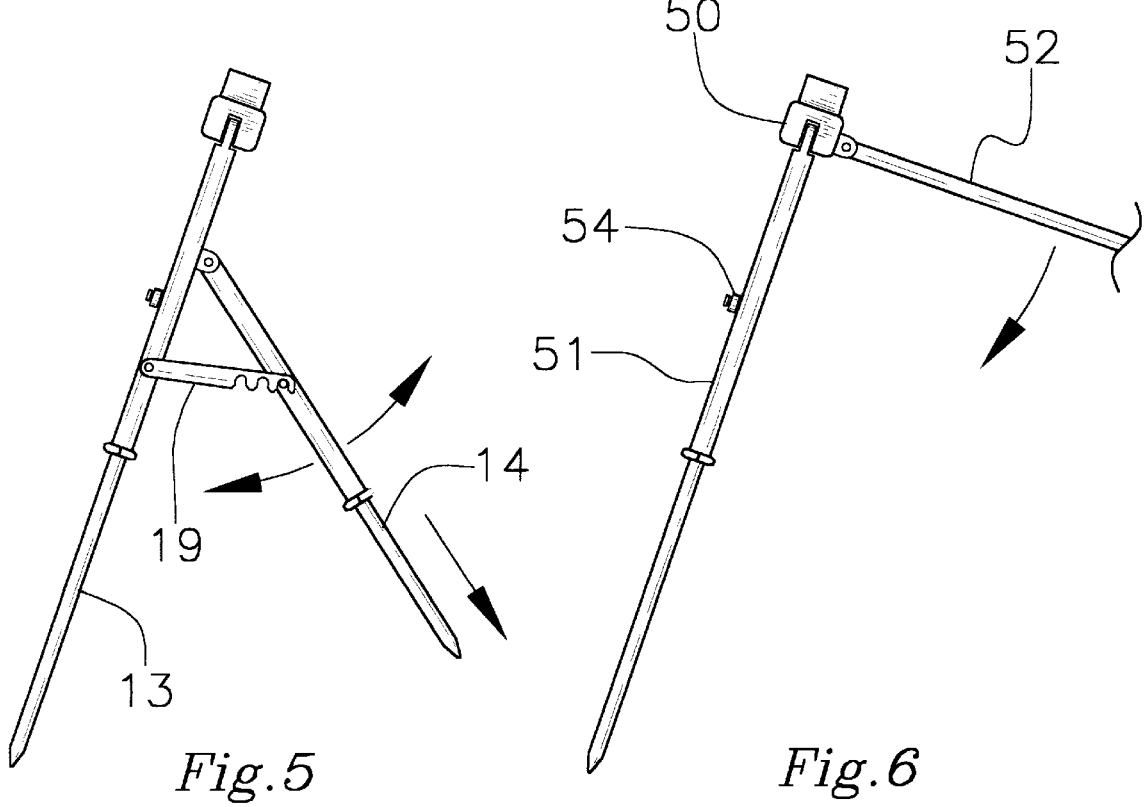
FIG. 5 is a schematic side view of the present invention.

With reference now to the drawings, and in particular to FIGS. 1 through 8 thereof, a new support for fishing rod embodying the principles and concepts of the present invention and generally designated by the reference numeral 10 will be described.

As best illustrated in FIGS. 1 through 8, the support for fishing rod 10 generally comprises a head portion 12, a pair of first legs 13 pivotally coupled to the head portion and downwardly depending therefrom, and a pair of second legs 14 pivotally coupled to the first legs. Each of the second legs is telescopically extendible. The head portion has a channel 15 extending into an upper face thereof that is adapted for receiving a fishing rod 1 therein.

The upper ends 16 of the second legs should be fastened to the first legs at a position about ⅓ of the length of the upper portions of the first legs from the head portion to lessen the distance between the lower ends of the first and second legs required to adequately balance the device against tipping forward such as when a fish pull on the fishing line. See FIGS. 1 and 5. The greater the angle of the first legs from the vertical, the harder it will be to tip the rod holder forward.

Preferably, each of the first legs is telescopically extendible. Also preferably, each of the first and second legs has a pointed lower end 17. The pointed tips help anchor the device to the ground, especially when the lower ends of the legs are pushed into the ground.

Preferably, a front spacer arm 18 is pivotally coupled to one of the first legs and is detachably coupleable to the other of the first legs for restricting pivoting of the first legs with respect to each other. A pair of lateral spacer arms 19 may also be pivotally coupled to the first legs and be detachably coupleable to the second legs for restricting pivoting of the second legs with respect to the first legs. Ideally, each of the spacer arms has a plurality of slots 20 therein positioned towards and generally parallel to a free end thereof. The slots are adapted for engaging a protuberance extending from the leg to which the spacer arm is detachably coupleable.

Also preferably, the head portion has a pair of wings 21 extending upwardly therefrom for directing the fishing rod into the channel. The wings also prevent the rod from slipping off of the head portion if the rod comes out of the channel.

Optionally, a rod handle support 22 may be provided for preventing a reel of the rod from contacting a ground surface. The rod handle support has a tubular main portion 23 and a spike member 24 extending from the main portion. The main portion is adapted for receiving a handle portion 2 of the rod. The spike member is adapted for engaging a ground surface.

The main portion may have a resiliently deformable inner layer, such as foam rubber, that frictionally and nonrotatably engages the rod. Then the spike member would merely rest on the ground surface. The rod would be picked up and the rod handle support would remain coupled to it.

Alternatively, the main portion may be large enough that the rod slides freely into and out of the main portion. Then the spike portion would be driven into the ground surface. As the rod is picked up, it is slid out of the main portion.

In use, the first legs are spread apart and the second legs are pivoted away from the first legs. The fishing line is cast and set, then the rod is placed in the channel of the head portion and the handle is rested on the ground. The rod handle support may also be used to hold the rod handle off of the ground.

Figure 6:
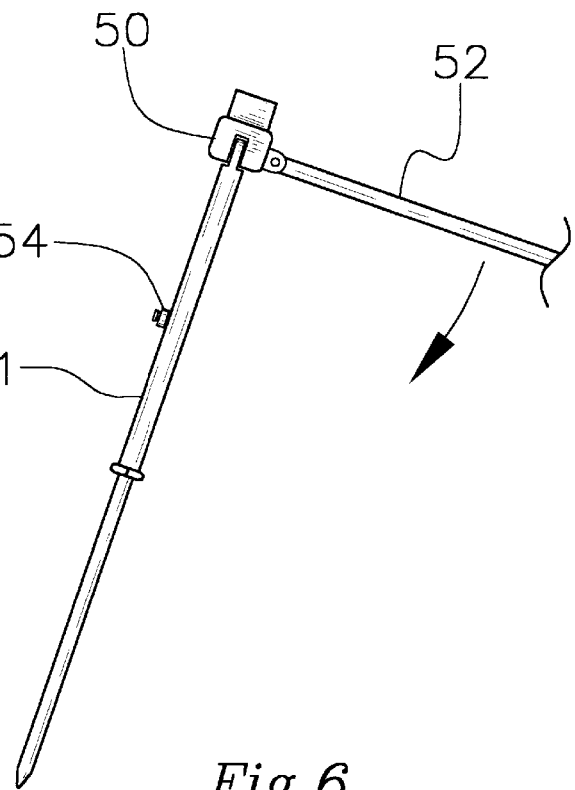
FIG. 6 is a schematic side view of the present invention.
Figure 7:
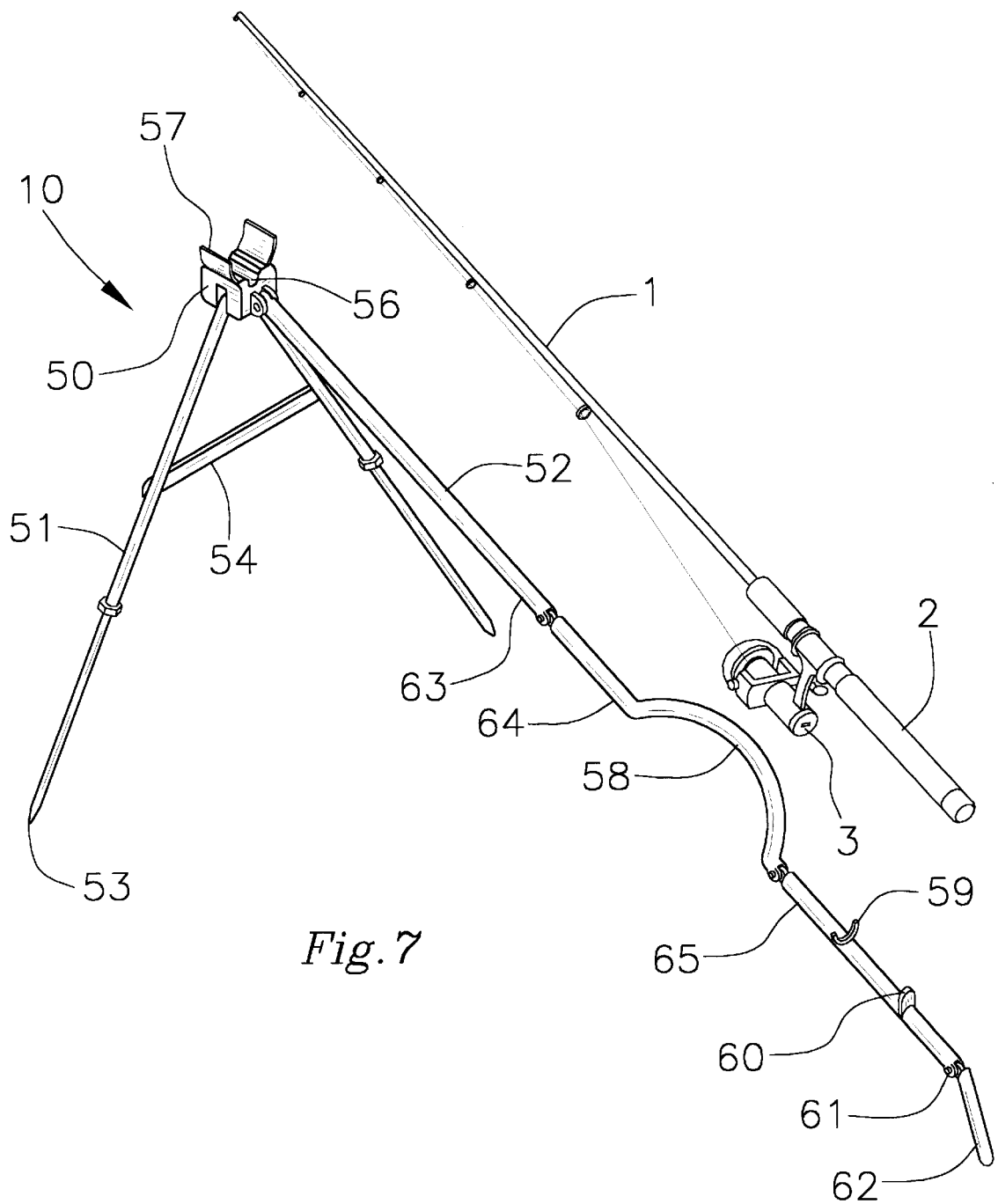
FIG. 7 is a schematic perspective view of an alternate embodiment of the present invention.

FIGS. 6 and 7 show an alternate support device. The alternate support device has a head portion 50, a pair of first legs 51 pivotally coupled to the head portion and downwardly depending therefrom, and a third leg 52 pivotally coupled to the head portion. Each of the first legs is telescopically extendible. Ideally, each of the first legs has a pointed lower end 53. This helps anchor the device to the ground, especially when the lower ends of the first legs are pushed into the ground.

A front spacer arm 54 may be pivotally coupled to one of the first legs and would be detachably coupleable to the other of the first legs for restricting pivoting of the first legs with respect to each other. Ideally, the spacer arm would have a plurality of slots therein positioned towards and generally parallel to a free end thereof. The slots are adapted for engaging a protuberance extending from the leg to which the spacer arm is detachably coupleable.

The head portion has a channel 56 extending into its upper face that is adapted for receiving a fishing rod therein. Ideally, the head portion has a pair of wings 57 extending upwardly therefrom for directing the fishing rod into the channel. The wings also prevent the rod from slipping off of the head portion if the rod comes out of the channel.

Preferably, the third leg has an arcuate portion 58 so that the reel 3 will fit into the opening formed by the arcuate portion and be generally aligned with the remainder of the third leg. The third leg also has a generally U-shaped or V-shaped support member 59 coupled to it that opens upwardly. The support member holds the rod above the third leg. An end stop 60 extends upwardly from the third leg for limiting sliding of the rod along the third leg towards a free end 61 of the third leg.

An optional raising member 62 is pivotally coupled to the free end of the third leg for raising the free end of the third leg off of the ground surface. The raising member is oriented generally perpendicular the third leg and is aimed downwardly to lift the free end of the third leg off of the ground. This feature is particularly useful during rain, when mud and water could splash up towards the rod.

Ideally, the third leg has three foldable sections 63,64,65 that are pivotally coupled together. As seen in FIG. 7, the third leg unfolds only to a straight position and will not go past that. Stop hinges or any other suitable means may be used to limit the pivoting of the sections to 180 degrees with respect to each other.

In use, the first legs are spread apart and the third leg is unfolded. The fishing line is cast and set, then the rod is rested in the channel of the head portion and in the support member of the third leg.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A support device for supporting a fishing rod, comprising:
   a head portion;
   a pair of first legs pivotally coupled to said head portion and downwardly depending therefrom;
   a pair of second legs being pivotally coupled to said first legs;
   each of said second legs being telescopically extendible;
   said head portion having a channel extending into an upper face thereof and adapted for receiving a fishing rod therein; and
   a rod handle support for preventing a reel of the rod from contacting a ground surface, said rod handle support having a tubular main portion and a spike member extending from said main portion, said main portion being adapted for receiving a handle portion of said rod, said spike member being adapted for engaging a ground surface.

2. The support device of claim 1, wherein each of said first legs is telescopically extendible.

3. The support device of claim 1, wherein each of said first and second legs has a pointed lower end.

4. The support device of claim 1, further comprising a front spacer arm being pivotally coupled to one of said first legs and being detachably coupleable to the other of said first legs for restricting pivoting of said first legs with respect to each other.

5. The support device of claim 1, wherein a pair of lateral spacer arms are pivotally coupled to said first legs and are detachably coupleable to said second legs for restricting pivoting of said second legs with respect to said first legs.

6. The support device of claim 1, wherein said head portion has a pair of wings extending upwardly therefrom for directing said fishing rod into said channel.

7. A support device for supporting a fishing rod, comprising:
   a head portion;
   a pair of first legs pivotally coupled to said head portion and downwardly depending therefrom;
   a third leg being pivotally coupled to said head portion;
   each of said first legs being telescopically extendible;
   said head portion having a channel extending into an upper face thereof and adapted for receiving a fishing rod therein;
   wherein said third leg has a plurality foldable sections being pivotally coupled together;
   wherein said second section of said third leg has an arcuate portion;
   wherein one of said sections of said third leg has a generally U-shaped support member coupled thereto and opening upwardly, said support member being for holding said rod above said third leg;
   an end stop extending upwardly from said third section of said third leg for limiting sliding of said rod along said third leg towards a free end of said third leg; and
   wherein a raising member is pivotally coupled to a free end of said third section of said third leg for raising said free end of said third leg off of the ground surface.

8. The support device of claim 7, wherein each of said first legs has a pointed lower end.

9. The support device of claim 7, further comprising a front spacer arm being pivotally coupled to one of said first legs and being detachably coupleable to the other of said first legs for restricting pivoting of said first legs with respect to each other.

10. The support device of claim 7, wherein said head portion having a pair of wings extending upwardly therefrom for directing said fishing rod into said channel.

11. A support system for supporting fishing rods, comprising in combination:
    a first support device, comprising:
      a head portion;
      a pair of first legs pivotally coupled to said head portion and downwardly depending therefrom;
      a pair of second legs being pivotally coupled to said first legs;
      each of said first legs being telescopically extendible;
      each of said second legs being telescopically extendible;
      wherein each of said first and second legs has a pointed lower end;
      a front spacer arm being pivotally coupled to one of said first legs and being detachably coupleable to the other of said first legs for restricting pivoting of said first legs with respect to each other;
      a pair of lateral spacer arms being pivotally coupled to said first legs and being detachably coupleable to said second legs for restricting pivoting of said second legs with respect to said first legs;

wherein each of said spacer arms has a plurality of slots therein positioned towards a free end thereof, said slots being adapted for engaging a protuberance extending from the leg to which the spacer arm is detachably coupleable;

said head portion having a channel extending into an upper face thereof and adapted for receiving a fishing rod therein;

said head portion having a pair of wings extending upwardly therefrom for directing said fishing rod into said channel; and a rod handle support for preventing a reel of the rod from contacting a ground surface, said rod handle support having a tubular main portion and a spike member extending from said main portion, said main portion being adapted for receiving a handle portion of said rod, said spike member being adapted for engaging a ground surface; and a second support device, comprising:

a head portion;

a pair of first legs pivotally coupled to said head portion and downwardly depending therefrom;

a third leg being pivotally coupled to said head portion;

each of said first legs being telescopically extendible;

wherein each of said first legs has a pointed lower end;

a front spacer arm being pivotally coupled to one of said first legs and being detachably coupleable to the other of said first legs for restricting pivoting of said first legs with respect to each other;

wherein said spacer arm has a plurality of slots therein positioned towards a free end thereof, said slots being adapted for engaging a protuberance extending from the leg to which the spacer arm is detachably coupleable;

said head portion having a channel extending into an upper face thereof and adapted for receiving a fishing rod therein;

said head portion having a pair of wings extending upwardly therefrom for directing said fishing rod into said channel;

said third leg having an arcuate portion;

said third leg having a generally U-shaped support member coupled thereto and opening upwardly, said support member being for holding said rod above said third leg;

an end stop extending upwardly from said third leg for limiting sliding of said rod along said third leg towards a free end of said third leg; and a raising member pivotally coupled to said free end of said third leg for raising said free end of said third leg off of the ground surface, said raising member being oriented generally perpendicular said third leg;

said third leg having three foldable sections being pivotally coupled together.

* * * * *